US006271842B1

(12) United States Patent
Bardon et al.

(10) Patent No.: US 6,271,842 B1
(45) Date of Patent: Aug. 7, 2001

(54) NAVIGATION VIA ENVIRONMENTAL OBJECTS IN THREE-DIMENSIONAL WORKSPACE INTERACTIVE DISPLAYS

(75) Inventors: Didier Daniel Claude Bardon, Austin; Richard Edmond Berry; Scott Harlan Isensee, both of Georgetown, all of TX (US); David John Roberts, Stockton (GB)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 08/825,985

(22) Filed: Apr. 4, 1997

(51) Int. Cl.[7] .................................................. G06F 13/00
(52) U.S. Cl. ........................................... 345/355; 345/339
(58) Field of Search ..................................... 345/326, 339, 345/355

(56) References Cited

U.S. PATENT DOCUMENTS

| 4,857,902 | 8/1989 | Naimark et al. ..................... 340/709 |
|---|---|---|
| 4,939,507 | 7/1990 | Beard et al. ......................... 340/706 |
| 5,107,443 | 4/1992 | Smith et al. ......................... 395/158 |
| 5,512,920 | * 4/1996 | Gibson ................................. 345/163 |
| 5,555,354 | 9/1996 | Strasnick et al. ..................... 395/127 |
| 5,737,533 | * 4/1998 | De Hond ......................... 395/200.49 |
| 5,745,109 | * 4/1998 | Nakano et al. ....................... 345/340 |
| 5,808,609 | * 9/1998 | Guha .................................... 345/339 |

\* cited by examiner

*Primary Examiner*—Ba Huynh
(74) *Attorney, Agent, or Firm*—J. B. Kraft; Volel Emile (57) ABSTRACT

A system, method and computer program are provided for viewer navigation within a virtual reality three-dimensional workspace containing functional three-dimensional objects which are capable of being moved and environmental three-dimensional objects which have stationary positions in the workspace. Navigation from an initial viewpoint interface in the virtual reality workspace to a subsequent viewpoint is carried out by the viewer selecting an environmental object whereupon the system responds by shifting the viewpoint to a subsequent position in the workspace.

12 Claims, 5 Drawing Sheets

NAVIGATION VIA ENVIRONMENTAL OBJECTS IN THREE-DIMENSIONAL WORKSPACE INTERACTIVE DISPLAYS

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891, filed Mar. 7, 1997, entitled "VIEWER INTERACTIVE OBJECT IN VIRTUAL THREE-DIMENSIONAL WORKSPACE" and Ser. No. 08/813,848, filed Mar. 7, 1997, entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations. The invention facilitates the user's navigation in the 3D space so that the user may easily and quickly continue or change the navigational path.

SUMMARY OF THE INVENTION

It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or viewing direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused on the direction in which the viewer or user is interactively navigating and to choose the user's path as well as branches in the path as easily and quickly as possible.

The present invention provides a solution of the user navigation need by providing a display of virtual three-dimensional objects within a three-dimensional workspace. The viewer or user is provided with an interactive viewpoint to the display. There are two types of objects in the display: functional objects and navigational objects. The functional objects are interactive objects which the viewer may select by appropriate pointing means to provide any conventional functions generally provided by three-dimensional objects or icons in past two-dimensional displays, e.g. providing access to menus, spreadsheets, libraries, graphics, animation, etc. In addition there are provided navigational objects, which when selected by the viewer perform the navigational function of changing the viewpoint of the user. These navigational objects are preferably environmental objects such as floors, walls, ceilings or columns in interior 3D workspaces or trees, fountains, towers or pathways in exterior landscapes. Thus, means are provided such as conventional pointing means, e.g. mouse systems, for the user to select or click onto an environmental object. When this is done, the user's viewpoint will automatically be moved to a point associated with the environmental object. For example, clicking on a tower might move a user to an aerial view of the land below or clicking on a wall in an art museum might move the user to a viewpoint from which a collection of paintings on the wall could be viewed together. In this manner, a viewer navigating through a workspace may traverse relatively large apparent distances along a path while still maintaining his most optimum or desirable path through the complexities of the three-dimensional workspace.

In accordance with a preferred aspect of the present invention, while functional objects may be moved using means known in the art and described in the above referenced patents and patent applications, it is desirable that environmental objects remain stationary and not readily moveable by the viewer. In this manner, an environmental stability is maintained in the workspace which makes navigation easier and less confusing and the workspace configuration easier to memorize.

As will be hereinafter described in greater detail, it is preferable to provide means for maintaining environmental or navigational objects in stationary positions relative to moveable functional objects, when such functional objects are moved by the viewer.

DETAILED DESCRIPTION OF THE PREFERRED EMBODIMENT

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be implemented using object oriented programming techniques, such as the object oriented techniques described in the above-mentioned copending application 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such pre-defined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Figure 1:
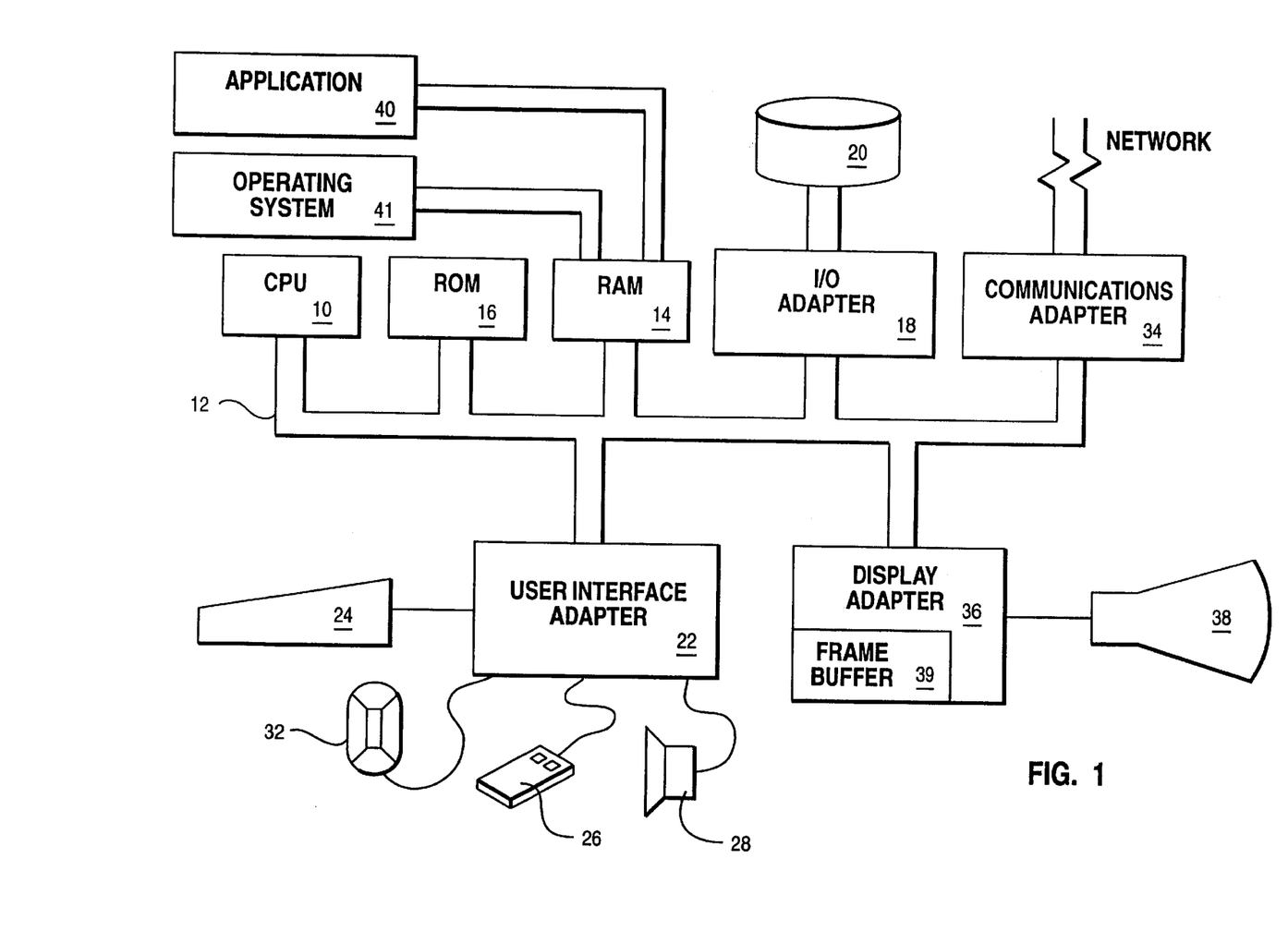
FIG. 1 is a block diagram of a data processing system including a central processing unit which is capable of implementing the present invention.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 in which application 40 operates.

Figure 2:
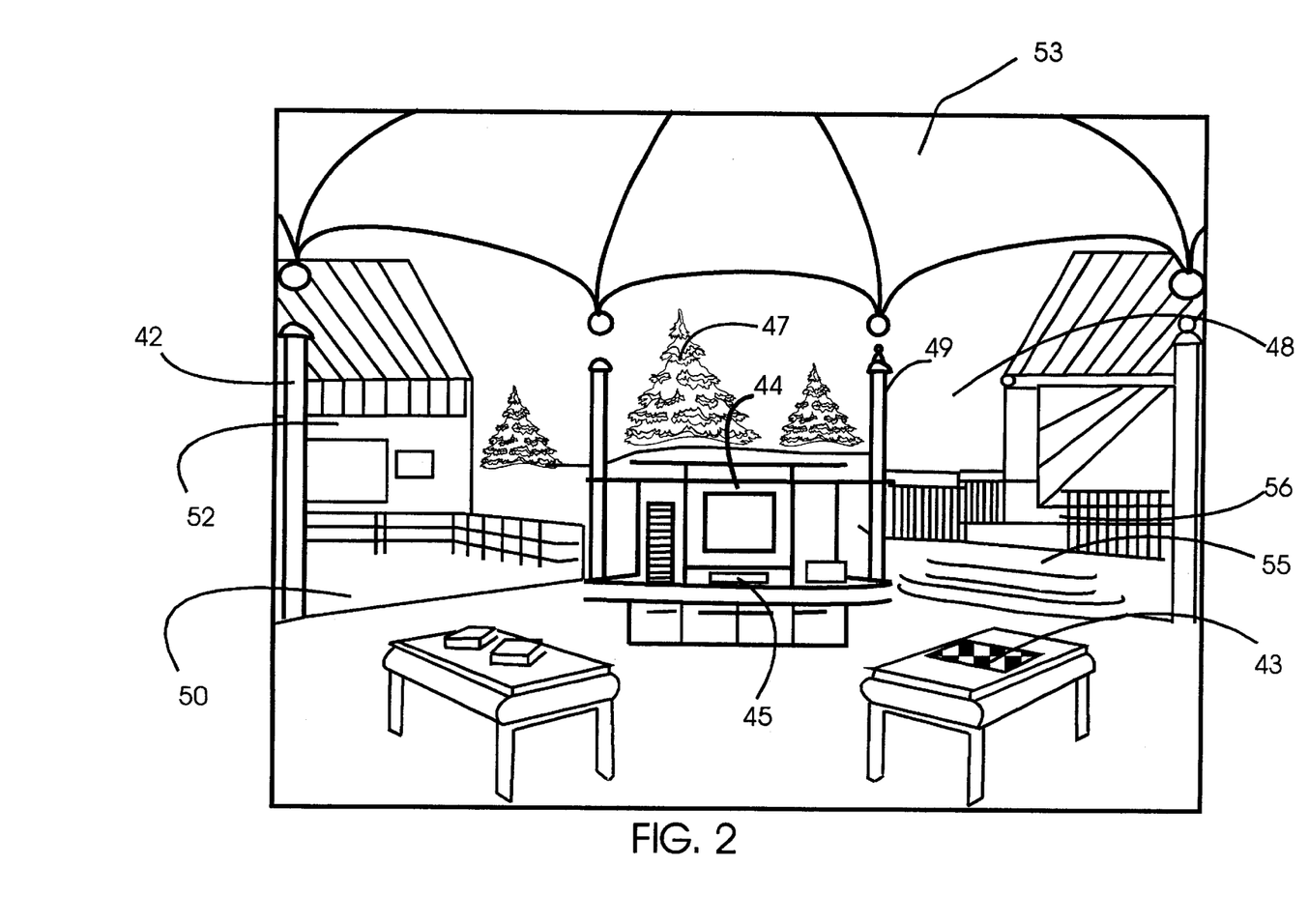
FIG. 2 shows the virtual reality workspace in accordance with the present invention at an initial viewpoint before navigation in accordance with the present invention takes place.

An embodiment of the present invention will now be described with respect to the virtual reality three-dimensional workspace shown in FIG. 2. The workspace 42 is shown as an open living area which has both an internal and external environment containing the various objects to be subsequently described. Let us consider the image in FIG. 2 as an initial view point of this three-dimensional space presented to the viewer at a display interface such as that which could be shown on display monitor 38 of FIG. 1. In accordance with conventional techniques, the user may control the viewpoint through conventional I/O devices such as mouse 26 in FIG. 1 which operates through user interface 22 to call upon the VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer or backs away from objects in the workspace or moves to the right or left in the workspace. All this may be controlled by a suitable I/O device such as mouse 26 of FIG. 1.

In accordance with the present invention, the workspace 42 in FIG. 2 contains both functional objects and environmental objects. Some of the functional objects are game board 43, TV 44, VCR 45 and CD player 46. These are called functional objects because they are interactive objects which the viewer may select to provide any conventional functions generally provided by three-dimensional objects or icons in past two-dimensional displays, e.g. access to menus, spreadsheets, access to libraries, access to graphics, access to animation, etc. In the present case, game board 43 will provide access to a game played on the computer such as chess, functional object TV 44 would provide access to various TV functions which could be available. Similarly, VCR 45 and CD player 46 would provide access to interactive VCR or CD player functions. In addition to these functional objects, there are provided navigational objects such as tree 47 or chimney 48, externally, as well as column 49, floor sections 50 and 51, wall 52 or ceiling 53, externally. These navigational objects which are "environmental" in nature when selected by the viewer perform the navigational function of changing the viewpoint of the viewer with respect to the three-dimensional workspace 42. The following simple example should illustrate a basic invention.

Figure 3:
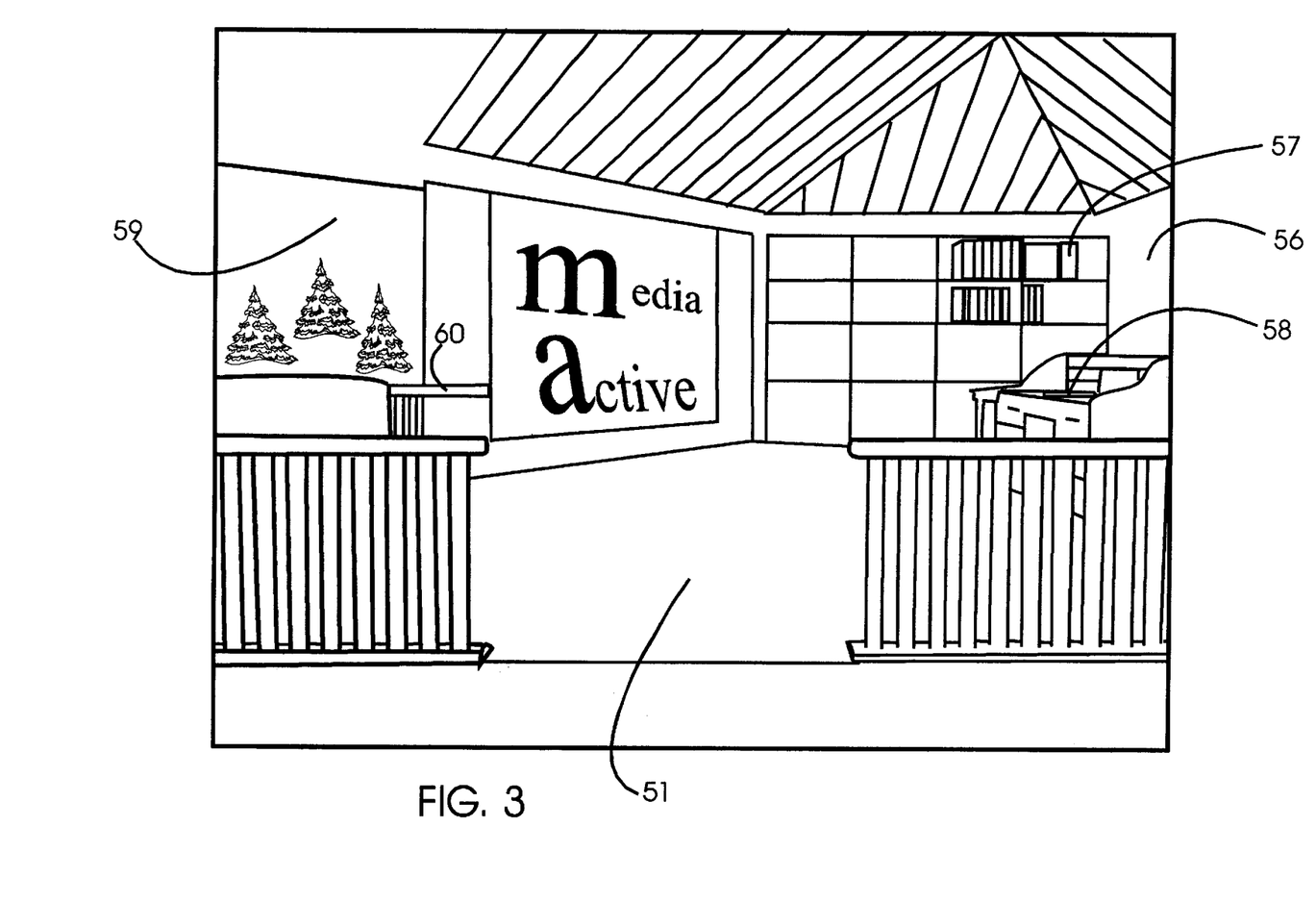
FIG. 3 is a representation of the virtual reality workspace of FIG. 2 after the viewer has made a navigational change by selecting an environmental object.

Let us assume that the viewpoint described with respect to FIG. 2 is the initial viewpoint of the viewer at a particular point in his navigation through the workspace. The viewer wishes to have his path ascend stairs 55 into elevated room 56. With a suitable pointing device such as a cursor or other indicator visible on the screen and controlled by mouse 26 of FIG. 1, he points to floor 51 in FIG. 2 which is the environmental or navigational object leading to the entry into room 56. The viewer is immediately presented with a new viewpoint as shown in FIG. 3. He is in the entryway to room 56 which appears to be a library having a variety of functional items such as those on bookshelf 57 or desk 58. At this point he may enter into a functional mode by selecting one of the functional objects in bookshelf 57 or desk 58 or he may decide to leave the room. If he wishes to go outside, he can point to and click onto navigational or environmental object, sky 59 or railing 60.

As previously indicated, it is desirable that the environmental objects be stationary and preferably not moveable so as to provide the viewer or user with a stationary environment through which he may select his path to the various functional objects in the three-dimensional workspace. On the other hand, the variously described functional objects may be moveable so that the user can rearrange them within his environment in any conventional manner.

It should also be noted that while the above embodiment of the present invention involves object oriented programming to construct the object entities on the display, the objects with their associated face views may be implemented in a more traditional language such as "C" or "Basic".

Figure 4A:
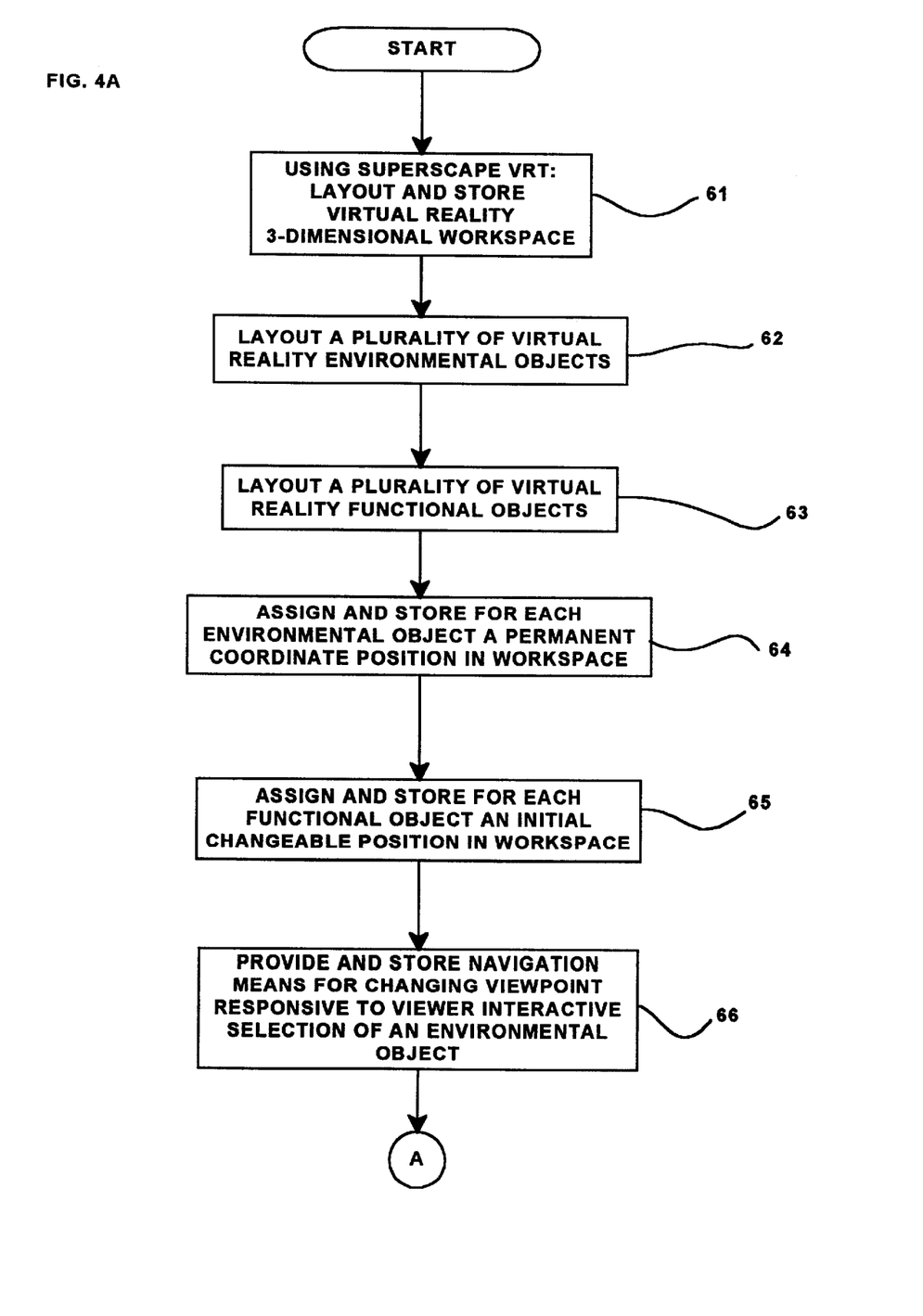
FIGS. 4A and 4B are flowcharts of the process implemented by the present invention for developing the virtual reality layout program (FIG. 4A) and for navigating through the virtual reality layout (FIG. 4B).
Figure 4B:
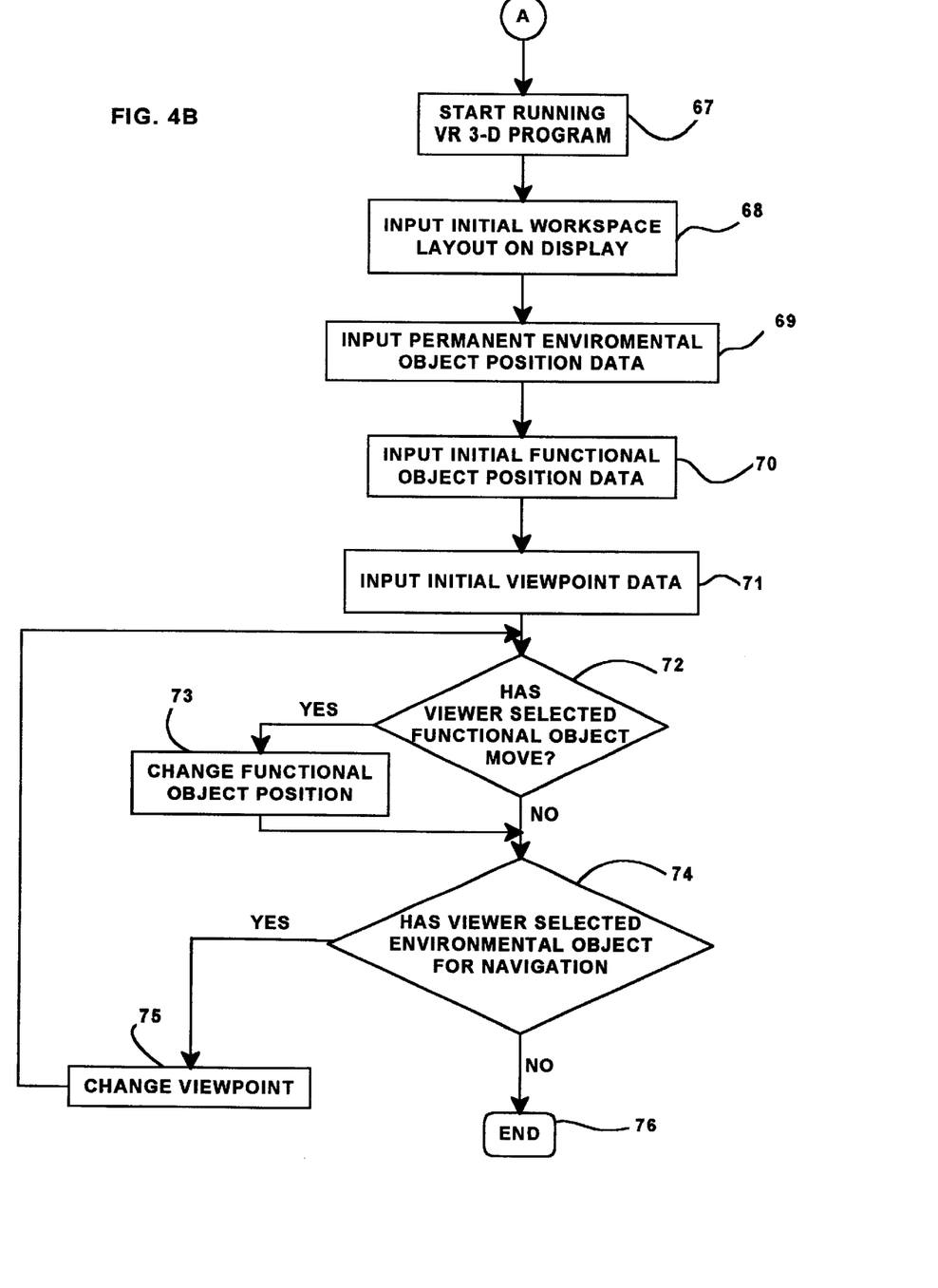

Now, with reference to FIGS. 4A and 4B, we will describe a process implemented by the present invention in conjunction with the flowcharts of FIGS. 4A and 4B. The flowcharts are in two parts: FIGS. 4A and 4B. The steps in FIG. 4A relate to the development of the virtual reality landscapes, the functional objects, the environmental objects and their positioning in the landscape in accordance with the present invention using the previously described superscape VRT programming toolkit.

First, step 61, FIG. 4A, the desired virtual reality three-dimensional workspace, for example, workspace 42, FIG. 2, is created and stored. Next, step 62, the virtual reality environmental objects are created and laid out. These virtual reality environmental objects are, for example, ceiling 53, wall 52, tree 47, sky 48 in FIG. 2. Next, step 63, the virtual reality functional objects are created and laid out. Some previously mentioned examples of these would be the game board 43, the TV 44, the CD player 46 in FIG. 2. Next, step 64, the object oriented program described above assigns and stores for each environmental object a permanent coordinate position in the above-described virtual workspace. Next, step 65, the program assigns and stores for each functional object, an initial position in the above-described workspace which position is changeable, i.e. unlike the permanent environmental objects, the functional objects may be moved by the viewer if he desires to rearrange his virtual reality landscape using conventional three-dimensional objects moving means available in the art.

Next, step 66, there is provided and stored navigation means for changing the viewpoint of the viewer at the display interface responsive to the viewer interactively selecting one of the environmental objects to function as navigation path shifting or changing means. This will be described in greater detail with respect to FIG. 4B.

The process now proceeds to point A in FIG. 4B whereat the created virtual reality workspace navigation program is run, step 67. As previously mentioned, the program is run on a system such as that shown in FIG. 1 with the particular application program 40 herein being loaded on RAM 14 connected to display buffer 36 which forms the stored images via frame buffer 39 controlling display monitor 38. The program initially sets up the workspace layout on the display, step 68. It also inputs and sets up, step 69, the environmental objects in their permanent positions in the three-dimensional workspace. Also set up, step 70, are the functional objects and their initial positions in the three-dimensional workspace. Next, initial viewpoints data is input, step 71, which creates the initial viewpoint, e.g. the initial viewpoint in FIG. 2.

It has been previously mentioned that in the present embodiment, the viewer or user has the capability of moving functional objects but the environmental objects are permanently in their starting positions. Thus, a determination is first made, decision step 72, as to whether the viewer has selected a functional object move. If he has, the program proceeds to step 73 wherein the selected functional object is moved to its selected position. The program then goes on to decision step 74 which is the same point that the program proceeds to if the decision from decision block 72 is null, there is no functional object move. Next, at decision step 74 a determination is made as to whether the viewer has selected an environmental object in order to change the viewpoint or path through the 3D workspace. If the viewer has, then the system proceeds to step 75 wherein the viewpoint is changed, e.g. the previously described selection of floor 51 (an environmental object) in FIG. 2 shifts the viewpoint to that shown in FIG. 3. After the viewpoint changes, the program returns to decision step 72 where the changed viewpoint shown in FIG. 3 is now regarded as the new initial viewpoint.

If in previously described decision step 74 there is no further environmental object selected for navigation, this aspect of the program ends, step 76.

Although certain preferred embodiments have been shown and described, it will be understood that many changes and modifications may be made therein without departing from the scope and intent of the appended claims.

What is claimed is:

1. A data processor controlled display system for displaying a continuous virtual three-dimensional workspace comprising:

means for displaying a plurality of virtual three-dimensional functional objects within said workspace;

means for displaying at least one virtual three-dimensional navigational object within said workspace;

means for providing to a viewer, a first viewpoint into said continuous workspace; and viewer interactive means for navigating within said workspace comprising, viewer interactive means for selecting said at least one navigational object, and means responsive to a viewer selection for changing said first viewpoint into said continuous workspace to a second viewpoint.

2. The display system of claim 1 wherein said navigational object is an environmental object.

3. The display system of claim 2 further including viewer interactive means for moving said functional objects within said workspace.

4. The display system of claim 3 further including means for maintaining environmental objects in stationary positions relative to moved functional objects.

5. A computer implemented method for displaying a continuous virtual three-dimensional workspace comprising:

displaying a plurality of virtual three-dimensional functional objects within said workspace;

displaying at least one virtual three-dimensional navigational object within said workspace;

providing to a viewer a first viewpoint into said continuous workspace; and navigating within said workspace by steps comprising
   a viewer interactively selecting said at least one navigational object, and
   changing said first viewpoint to a second viewpoint into said continuous workspace in response to said viewer selection.

6. The method of claim 5 wherein said navigational object is an environmental object.

7. The method of claim 6 further including a viewer interactive step of moving one of said functional objects within said workspace.

8. The method of claim 7 wherein environmental objects are maintained in stationary positions relative to moved functional objects.

9. A computer program having data structures included on a computer readable medium which causes the display on a data processor supported display of a continuous virtual three-dimensional workspace comprising:

means for displaying a plurality of virtual three-dimensional objects within said workspace;

means for displaying at least one virtual three-dimensional navigational object within said workspace;

means for providing to a viewer, a first viewpoint into said continuous workspace; and viewer interactive means for navigating within said workspace comprising, viewer interactive means for selecting said at least one navigational object, and means responsive to a viewer selection for changing said first viewpoint into said continuous workspace to a second viewpoint.

10. The computer program according to claim 9 wherein said navigational object is a environmental object.

11. The computer program according to claim 10 further including viewer interactive means for moving said functional objects within said workspace.

12. The computer program of claim 11 further including means for maintaining environmental objects in stationary positions relative to moved functional objects.

* * * * *